(12) United States Patent
Narayanswamy et al.

(10) Patent No.: US 10,119,809 B2
(45) Date of Patent: Nov. 6, 2018

(54) SIMULATING MULTI-CAMERA IMAGING SYSTEMS

(71) Applicant: Intel Corporation, Santa Clara, CA (US)

(72) Inventors: Ramkumar Narayanswamy, Boulder, CO (US); Ginni Grover, Santa Clara, CA (US); Ram C. Nalla, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 14/749,786

(22) Filed: Jun. 25, 2015

(65) Prior Publication Data

US 2016/0241791 A1    Aug. 18, 2016

Related U.S. Application Data

(60) Provisional application No. 62/116,625, filed on Feb. 16, 2015.

(51) Int. Cl.
| | |
|---|---|
| *H04N 5/262* | (2006.01) |
| *G01B 11/245* | (2006.01) |
| *G06T 15/00* | (2011.01) |
| *H04N 5/225* | (2006.01) |
| *H04N 5/232* | (2006.01) |

(52) U.S. Cl.
CPC ............ *G01B 11/245* (2013.01); *G06T 15/00* (2013.01); *H04N 5/2258* (2013.01); *H04N 5/23229* (2013.01)

(58) Field of Classification Search
CPC .... G01B 11/245; G06T 15/00; H04N 5/2258; H04N 5/23229

USPC .................................................... 348/239, 47
See application file for complete search history.

(56) References Cited

U.S. PATENT DOCUMENTS

| | | | | |
|---|---|---|---|---|
| 6,028,606 | A * | 2/2000 | Kolb | G06T 15/06 345/419 |
| 6,268,863 | B1 * | 7/2001 | Rioux | G06T 15/00 345/426 |
| 7,256,782 | B2 * | 8/2007 | Aoyama | G06T 19/006 345/426 |
| 8,180,107 | B2 | 5/2012 | Broaddus et al. | |
| 8,228,327 | B2 * | 7/2012 | Hendrickson | H04N 13/0022 345/420 |
| 9,041,823 | B2 | 5/2015 | Venkataraman et al. | |
| 9,142,010 | B2 | 9/2015 | Watts et al. | |
| 9,846,119 | B2 * | 12/2017 | Kubo | G06T 11/001 |

(Continued)

OTHER PUBLICATIONS

PCT Search report and Written Opinion in corresponding PCT/US2016/014824 dated May 12, 2016 (7 pages).

(Continued)

*Primary Examiner* — Sinh Tran
*Assistant Examiner* — Zhenzhen Wu
(74) *Attorney, Agent, or Firm* — Trop, Pruner & Hu, P.C.

(57) ABSTRACT

Camera simulation is extended to multi-camera systems. One aspect relates combine computer-graphics, single-camera simulation, multi-camera image signal processor (ISP) are combined to simulate and optimize a multi-camera system. Scene modeling is performed using synthetic computer generated scenes. The computer-graphics images are generated, taking into account the camera-intrinsic and camera-extrinsic parameters.

31 Claims, 10 Drawing Sheets

(56) References Cited

U.S. PATENT DOCUMENTS

| | | | | |
|---|---|---|---|---|
| 2002/0063923 | A1* | 5/2002 | Coppeta | G01J 3/14 |
| | | | | 398/34 |
| 2007/0030342 | A1* | 2/2007 | Wilburn | H04N 5/247 |
| | | | | 348/47 |
| 2009/0066786 | A1* | 3/2009 | Landa | G02B 27/22 |
| | | | | 348/54 |
| 2009/0102841 | A1* | 4/2009 | Clavadetscher | G06T 15/20 |
| | | | | 345/420 |
| 2010/0231691 | A1* | 9/2010 | Lee | H04N 5/23212 |
| | | | | 348/47 |
| 2011/0157373 | A1* | 6/2011 | Ye | G06T 7/85 |
| | | | | 348/187 |
| 2012/0306876 | A1* | 12/2012 | Shotton | G06T 17/10 |
| | | | | 345/424 |
| 2012/0320039 | A1* | 12/2012 | Ha | G06T 19/006 |
| | | | | 345/419 |
| 2013/0071028 | A1* | 3/2013 | Schiller | G06T 5/003 |
| | | | | 382/180 |
| 2013/0162637 | A1* | 6/2013 | Son | G03H 1/08 |
| | | | | 345/419 |
| 2015/0278988 | A1* | 10/2015 | MacMillan | G06T 3/0068 |
| | | | | 348/218.1 |

OTHER PUBLICATIONS

Chen, J., et al., "Digital camera imaging system simulation," Nov. 2009, IEEE transactions on electron devices, vol. 56, No. 11 (10 pages).

Farrell, J., et al., "Digital camera simulation," Applied Optics, Feb. 2012, vol. 51, No. 4 (11 pages).

* cited by examiner

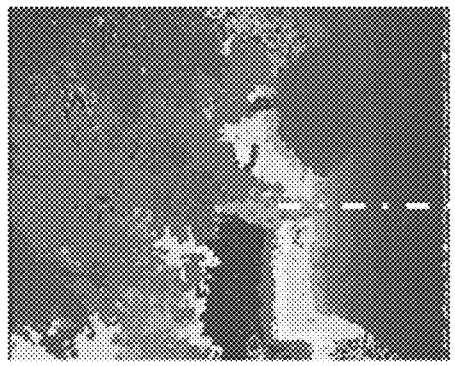
FIG. 9C 1080p
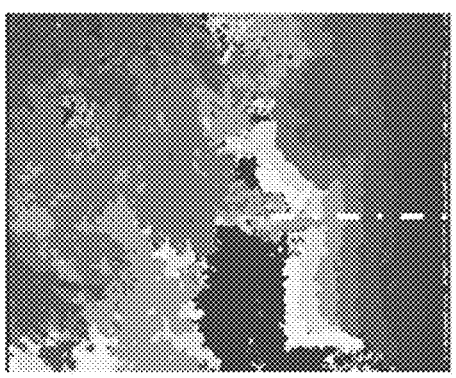
FIG. 9B 720p
FIG. 9A
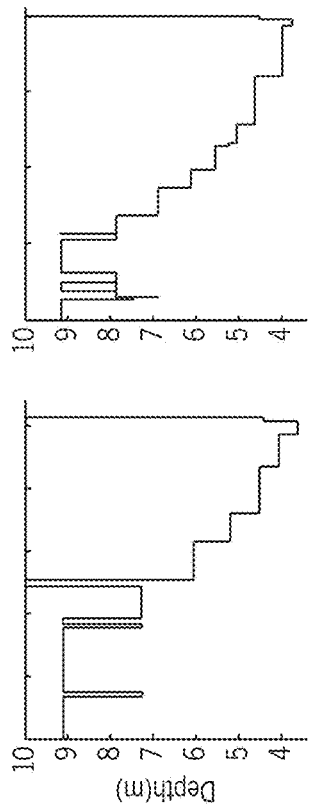
FIG. 9E
FIG. 9D

SIMULATING MULTI-CAMERA IMAGING SYSTEMS

CROSS-REFERENCE TO RELATED APPLICATION

This is a non-provisional application based on provisional application Ser. No. 62/116,625 filed on Feb. 16, 2015, hereby expressly incorporated by reference herein.

BACKGROUND

This relates to multi-camera imaging. Multi-camera imaging is an emerging field of computational photography. While the multi-camera imager is suitable for many applications, measurement of scene depth using parallax (disparity) is one of its fundamental advantages and leads to the many promising applications. Multiple camera platforms capture the same scene from different perspectives. The images are processed to determine the relative shift of the objects from one image to the next. The objects closer to the camera show more lateral shift, while objects farther from the camera show reduced lateral shift. This relative shift is referred to as disparity and is used to calculate depth. Various algorithms can be used for disparity (therefore depth) estimation.

Digital camera simulators are available as commercial software packages such as Imaging Systems Evaluation toolbox (ISET). These systems accurately model scene radiometry, optics and sensors of a traditional camera and allow simulating scenes with different camera parameters and scene properties. Such simulations of digital cameras have previously allowed scientists and engineers to quickly analyze, understand and design various camera components and evaluate relative performances of different designs.

An image simulation package divides camera simulation into different components including scene, optics, sensor and image processing, allowing control of parameters for each of those. The input parameters are either manufacturer specified or measured.

BRIEF DESCRIPTION OF THE DRAWINGS

Some embodiments are described with respect to the following figures:

FIG. 9A shows depth estimation for stereo pairs with simulated images by way of a photorealistic scene simulated for a stereo pair with a baseline of 37.5 mm;

FIGS. 9B and 9C show depth maps for two cases with both the cameras as generic mobile phone cameras with 720p and 1080p resolution, respectively, are simulated and analyzed, keeping all other camera parameters the same;

FIGS. 9D and 9E are colormaps showing increasing depth from blue to red, in the form of slices along the dashed white vertical lines in FIGS. 9B and 9C in the depth maps;

DETAILED DESCRIPTION

Figure 1:
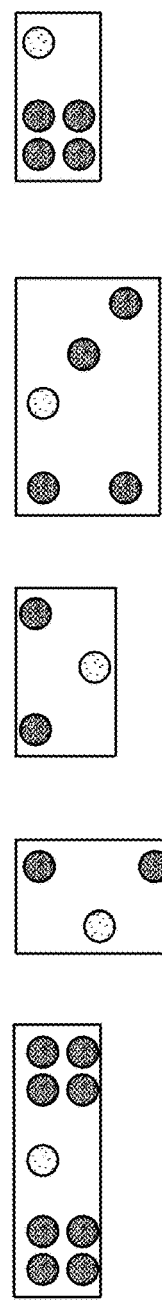
FIG. 1 is a depiction of representative multi-camera configurations of heterogeneous cameras.

A full system simulation method based on photorealistic computer generated content may be used for simulating hybrid multi-camera systems. Scene images for each of a plurality of cameras are generated using standard rendering packages. These images contain linear, high dynamic range scene irradiance data.

The method simulates multi-camera systems, by pre-computing the scene with the appropriate field of view and parallax using computer graphics. The method can simulate, for example, an array of homogenous cameras, an array of heterogeneous cameras, an array of conventional two-dimensional (2D) cameras and plenoptic cameras, an array of plenoptic cameras, an array of 2D RGB cameras and different spectral cameras like near infrared (IR), mid-wavelength IR, long-wavelength IR (LWIR), and ultraviolet (UV). The 2D cameras can be, for example, RBG, RBG-IR, RBG-Clear. The array of cameras can be, for example, such that each camera is monochromatic and that a collection of cameras covers the entire spectrum of interest from UV to LWIR.

The simulation can be used to determine the acceptable "as manufactured" specification for each camera-module, sensor or optics, such that the overall system delivered the desired results. Currently, the fact that each camera is part of an imaging-platform is not being addressed or exploited because there is no way to address this question.

The simulation can perform a sophisticated Monte-Carlo simulation where the system performance is characterized across an entire space spanned by all the variables in the system, including those of the components like the individual lenses, sensor and other variables within the components.

The simulation can also be used to model "graceful degradation," that happens if one of the cameras fails partially or completely. In a mission critical application, this can address fault-tolerance and robustness of the system.

The simulation can be used for video. The method is not limited to still images. Similarly, it can be applied to light-field captured media, like a plenoptic camera.

ISET is used, in one embodiment, to simulate image capture from a single camera. So in a multi-camera system, multiple executions of ISET are used. As a next step, the effect of optics on the scene is simulated. The optics simulation simulates either ideal lens blur or blurring the scene with aberrations as in real lenses. The optics module speeds up application of the shift-variant blur by using a windowed Fourier transform technique. The lensing effect can be modeled as a blurring operation, which is a convolution in the spatial domain in one embodiment. The convolution operation can also be implemented as a multiplication in the frequency domain in one embodiment. Computationally, performing the operation in the frequency domain is more efficient. In this case, the shift-variant blur of the lens is computed by windowing a small section of scene, converting into the frequency domain, applying the frequency representation of the local lens blur and transforming back to the spatial domain. In some embodiments, this improves simulation speed over a brute force method of applying a point spread function (PSF) at each pixel.

In the next step, photon capture and electronic effects of the sensor are applied which include, but are not limited to pixilation, quantum efficiency, color filter arrays, noise, etc. The sensor module delivers the raw image which is passed to the imaging processing module to convert it to an RGB image.

Camera simulation is extended to multi-camera systems. Computer-graphics, single-camera simulation, multi-camera image signal processor (ISP) are combined to simulate and optimize a multi-camera system. Scene modeling is performed using synthetic computer generated scenes. This does not preclude the use of real-images, as long as the scene and the camera-system are adequately characterized and accounted for in the modeling. Also, the computer graphics images are generated, taking into account the camera-intrinsic (e.g. field of view, focal length, sensor size) and camera-extrinsic parameters. The extrinsic parameters refer to the camera's geometric relationship with other cameras, location and orientation with respect the world around it. It is typically represented by a rotation matrix and translation matrix.

A wide range of camera configurations may be tested. FIG. 1 illustrates five camera configurations. The lighter circle, in each configuration, represents a high-resolution eight megapixel camera, while the darker circles represent low resolution 720 pixel cameras.

Figure 2:
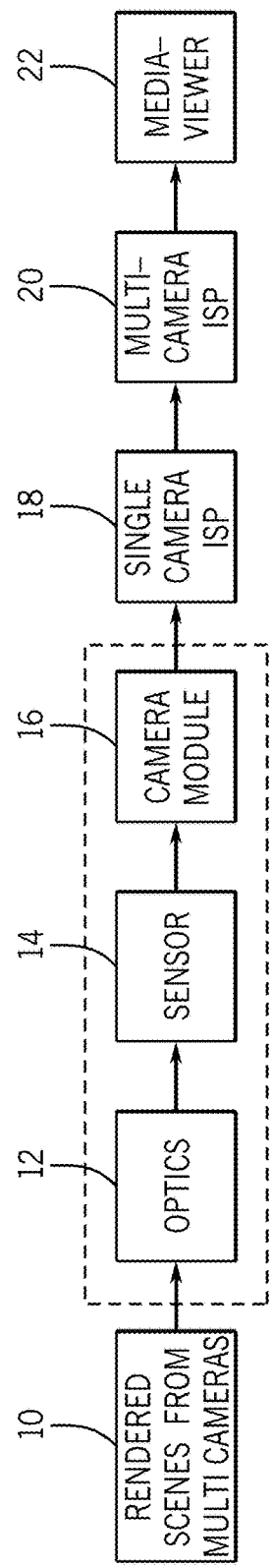
FIG. 2 is a block diagram of a multi-camera design tool according to one embodiment.

FIG. 2 is high level block diagram showing the various functional blocks in one embodiment of multi-camera design tool. First-order design questions about camera-configurations and expected performance can be quickly addressed in some embodiments.

Each camera, in a multi-camera system, views the scene with a unique point of view. The object parallax and the occlusion are specific to that camera's position and its intrinsic parameters such as field of view and sensor size. Multi-camera systems use this parallax to estimate object-depth and render a range of special effects, such as refocus, layer effects and re-illumination.

Computer-generated scenes are used as an input. The media specific to the camera's point-of-view and its intrinsic parameters, such as field of view and focal length, are generated. As the camera position changes, the captured field of view changes. Additionally, the occlusion between the various objects in the scene also changes. These sorts of effects are accounted for as part of the scene generation. The scene is constructed using a computer graphics rendering engine which starts with a 3D model of the scene and then renders the image seen by the camera using ray tracing methods. If a ray emanating from an object is blocked by another object in front of it with respect to the camera's field of view, the object is considered occluded. Therefore, for any specified camera position of the multi-camera array, an image is rendered which acts as the input scene to the simulation.

A large set of scenes is generated for each potential point-of-view that the multi-camera system may capture. In order to examine the multi-camera performance for a specific configuration, the computer generated image (CGI) corresponding to the exact point-of-view is used as an input and that image is propagated through the imaging system to account for the optical effects of the lens and the sensor capture effects. The "captured" image is passed through a single camera image signal processor (ISP). This process is repeated for every camera in the multi-camera system. Once all the RGB images are generated, they are passed through a multi-camera ISP to generate disparity and depth-estimation.

Each camera in the multi-camera system may use ISET to simulate the physics of imaging for that specific camera. ISET's capability is combined along with computer-generated imagery and multi-camera image sensing processor as a single entity.

Figure 3:
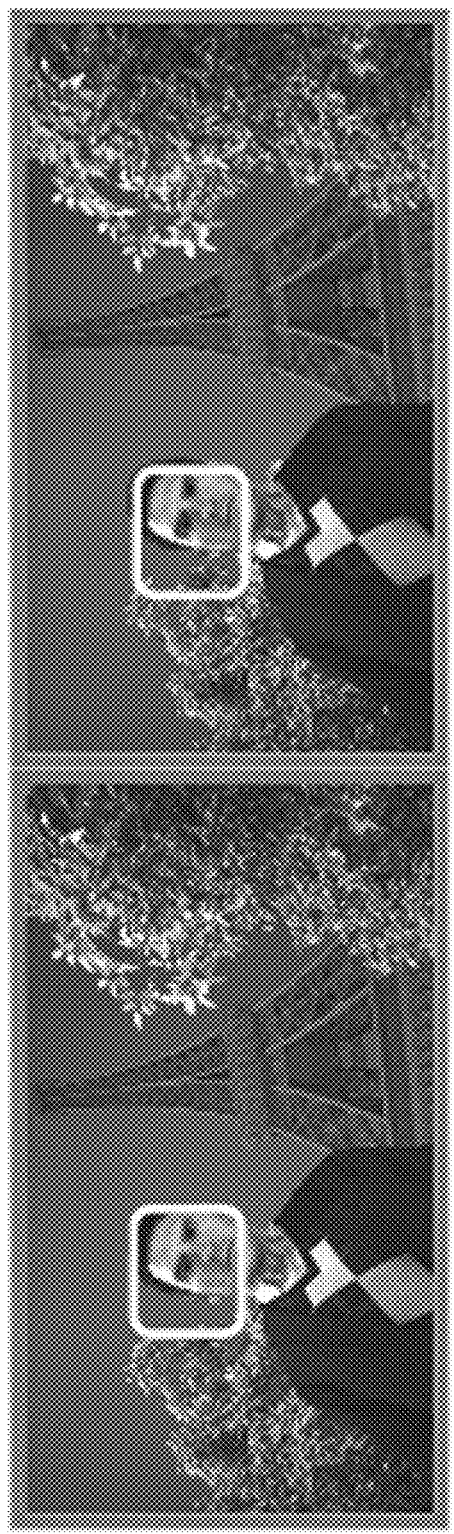
FIG. 3 is a depiction of computer generated images with parallax as seen by two cameras, as part of a stereo pair, according to one embodiment.

FIG. 3 is an example of our computer generated image for two cameras separated by a distance (called a baseline). The white-box highlights the parallax-effect for the tree limb in the image.

In the first part of simulation, computer-graphics generated scenes are "captured" by the camera as indicated at 10 in FIG. 2. These scenes may be generated with much higher spatial and color resolution than the camera would capture, without any distortions seen in the real cameras. This image then serves as the scene for the camera. The variables addressed by each generated scene include camera position, illumination and photo capture parameters to mention a few examples.

Figure 4:
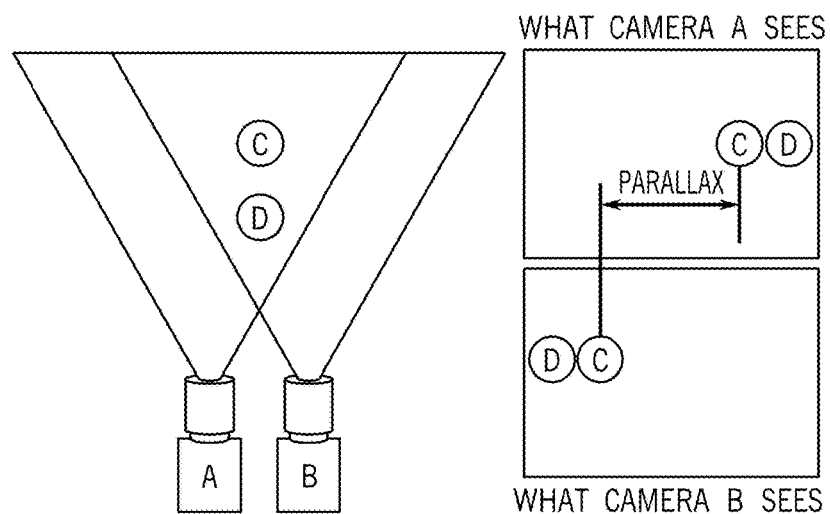
FIG. 4 shows a two camera system looking at two objects with different depths.

In multi-camera systems, the spatial separation between the cameras A and B induces parallax in the captured images such that objects C and D at different depths are seen shifted laterally between the images as shown in FIG. 4.

For multi-camera systems, images for a single scene may be generated from multiple viewpoints depending upon the geometry of the cameras. These images then serve as input scenes for the cameras as shown in FIG. 5.

Figure 5:
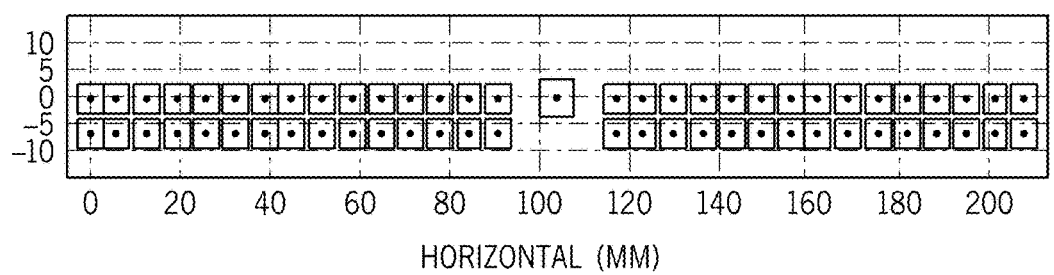
FIG. 5 is an example of 60 possible camera positions for which computer generated images can be pre-generated.

FIG. 5 is map of potential locations for the low-resolution cameras. The camera, shown as a square with a dot, in the middle (location (0,100) is the high resolution camera. The smaller squares represent the possible locations where the low-resolution camera can be placed. To simulate a 3-camera system, the high-resolution camera is in the middle and two low-resolution camera locations are chosen from the range of locations shown in FIG. 5. If the multi-camera system has five cameras, the high-resolution camera and four more camera locations are chosen. Choosing a camera location implies picking a specific CGI which was rendered for that camera location and camera intrinsic parameters. Illumination sources, luminance, etc. are set in the 3D model.

Once the 2D projection of the scene is created, the scene image is converted to the optical image by image propagation methods such as Fourier propagation as indicated by optics 12 (FIG. 2). The scene-image is a perfect rendition of the world. The optical image is the result after the lens has performed its "imaging functionality." This high resolution version of the scene is propagated to the lens entrance-pupil.

The optics module applies the focal length, and field of view, modulation transfer function (MTF) to the scene image resulting in an image at the sensor plane. The resulting optical image exhibits properties of light propagation through a lens such as reduced sharpness, blur and aberrations. Other image propagation methods may be used.

The scene is then processed such that the lens forms a de-magnified image of the scene on the sensor plane (block 14). Lens aberration and diffraction effects are faithfully imparted to the image generated on the sensor-plane. Various effects such as lens-to-lens misalignment, stray-light effects are also modelled.

The sensor 14 samples the scene and creates an image, adding noise from sources such as shot-noise, read-noise, photo-response-non-uniformity, fixed pattern noise, pixel-cross-talk and other electronic noise sources. Other aspects of the sensor, such as photon to electron conversion, finite pixel size, color filters and efficiency of light conversion, etc. may be taken into account in the sensor model.

The "raw" image from the sensor 14 is processed by a typical camera image-signal processing pipe 18 to deliver an RBG image from each camera sub-system 16. The pipe 18 may account for black level, demosaic, denoise, tone mapping and sharpening.

The model may include opto-mechanical aspects of the camera module (block 16) i.e. the alignment between the optical axis of the lens and the sensor center. It may include lens back-focal-length variations and error in the sensor position with respect to the lens focal plane. Thermal effects and other mechanical effects which manifest as one of the optical aberrations in the final image may be also included in the model.

All these images are fed into the "multi-camera" ISP 20 to extract disparity, depth and similar multi-camera parameters. These RBG images and their "multi-camera" metadata are sent to the media-viewer 22 which renders the special effects as chosen by the end-user such as view look and feel and application output. The simulation may model and include all these aspects with high accuracy in some embodiments.

During the process of generating the computer-generated scenes at the onset, a "ground-truth depth-map" of the scene is generated with respect to each of the cameras. Having the "ground-truth" allows comparing with the performance of the disparity and depth estimation algorithms as a function of various parameters such as texture, illumination, field-position, object distance and other characteristics. This analysis is highly desirable since passive-depth measurement is scene dependent and often has to be tested exhaustively over a range of scenes.

In the scene simulation part, high spectral resolution information about the scene is available, which allows testing of the chromatic fidelity of the camera system. In the future, ability to control the spectral content of the scene will be most useful in the design of hyper-spectral multi-camera systems.

The overall-system performance of a multi-camera system is often determined by the alignment and co-optimization of many parameters spread over numerous components—such as the lens quality, sensor operation, module construction and tolerance, ISP setting and computation power and so on. Having a detailed physics-based model of the entire imaging platform enables analysis of "what-if" scenarios in real-time, and avoids laborious, expensive and time-consuming prototype experiments in some embodiments.

Furthermore, since the simulation has been modelled to include limitations induced in the optical, mechanical, electrical, signal processing, manufacturing tolerances, manufacturing yield and testing-station, the final system may be optimized over most of the real-world constraints. An optimization of numerous parameters can be done with the help of this simulation tool, obtaining high performance systems in some embodiments.

Figure 6:
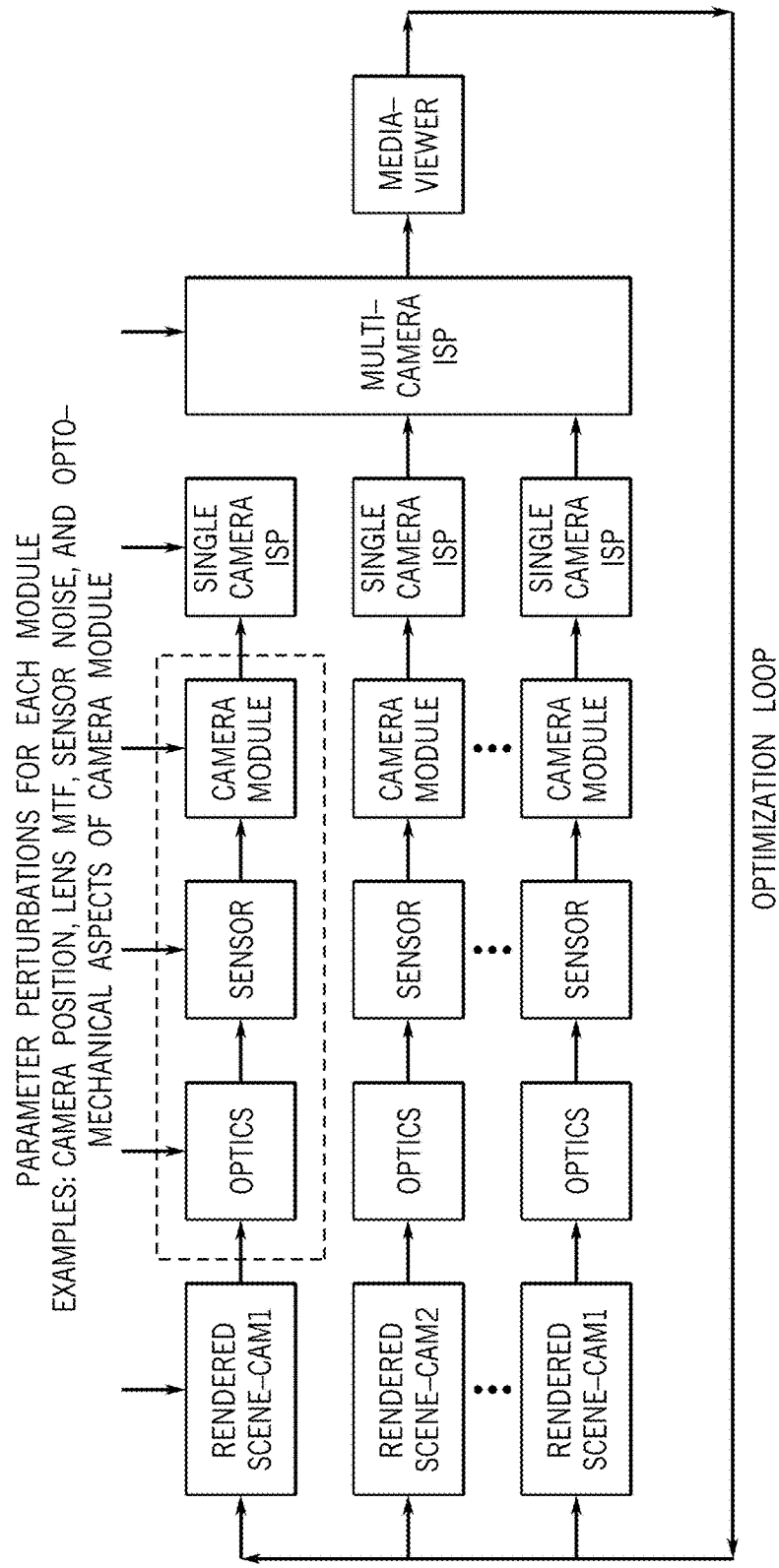
FIG. 6 is a block diagram of a multi-camera system for one embodiment showing how the simulation tools can be used to model the various components and how the overall system can be optimized.

FIG. 6 shows the entire multi-capture simulator as a block diagram. The rendered scene-CAM1 is the input, custom generated for a given camera's location and camera intrinsic parameters. The optics block simulates the physics of imaging with a lens. It models the blurring function and various distortions. The sensor samples the images using an array of pixels, blurs it due to its finite pixel-size and adds noise. The dotted box with optics+sensor+single camera ISP can be thought of as the ISET program. ISET does not implement camera module imperfections. In this multi-camera simulator, camera-module functionality may model various mechanical and opto-mechanical properties in some embodiments. This could include misalignments between the lens optical-axis and sensor, sensor orientation within the camera module and similar camera module related parameters which impact the captured image.

Single camera ISP in FIG. 6 is all the processing that is typically encountered in camera modules. It includes pixel-defection correction, demosiac, de-noise, sharpness, gamma tone mapping and scaling. The multi-camera ISP block stands for all the processing blocks associated with multi-camera systems, which include but are not limited to calibration-adjustments, rectification, disparity, depth estimation, segmentation and post capture effects. The media viewer are the blocks which help to visualize special effects such a refocus, layer-effects and new forms of visual media. The optimization loop indicates that this model can be used to perform system level optimization which can include a wide range of parameters including camera positions, camera intrinsic properties, lens properties, sensor properties, camera module tolerances and properties, single camera ISP tuning and multi-camera ISP tuning.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations of the disclosure.

Two cases are given that simulate images for multi-camera systems and analyze the depth measurement performance of these systems. The simulated images are appropriately rectified and passed to disparity estimation algorithm.

As is well known in theory, error in depth estimation depends on object depth, baseline and focal length of the cameras, and error in disparity estimation. Based on the disparity estimation algorithm used and scene properties such as texture, the error in disparity estimation varies.

Figure 7A:
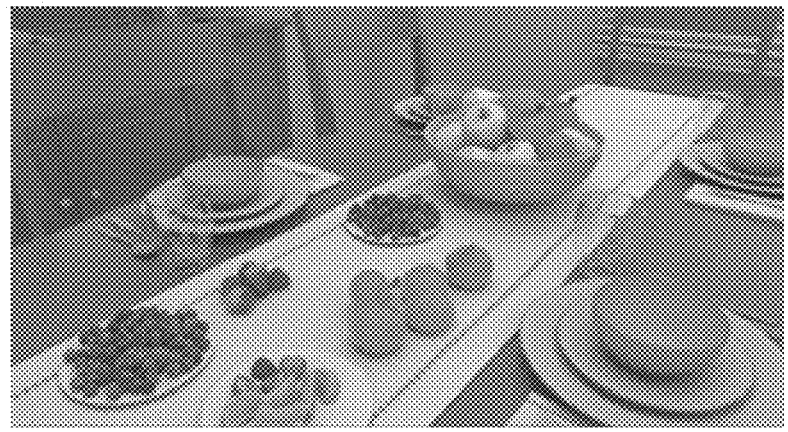
FIG. 7A is an example of a computer generated image of an indoor scene as seen by one camera of a multi-camera system.
Figure 7B:
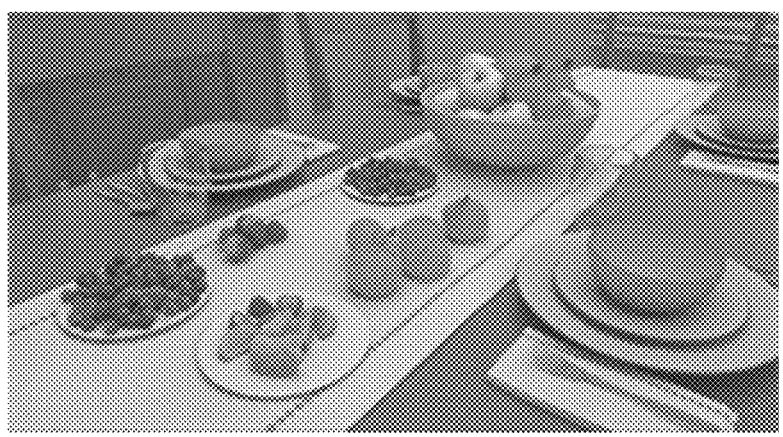
FIG. 7B is an example of an image taken by a camera at a different position.

FIGS. 7A and 7B show a typical indoor scene, each as seen by a different one of the cameras in the multi-camera platform. The scene is computer generated. Similar scenes are generated for each camera in the multi-camera system. Each scene corresponding to a unique camera will have a different field of view and relative positions of the objects due to the parallax.

Figure 8A:
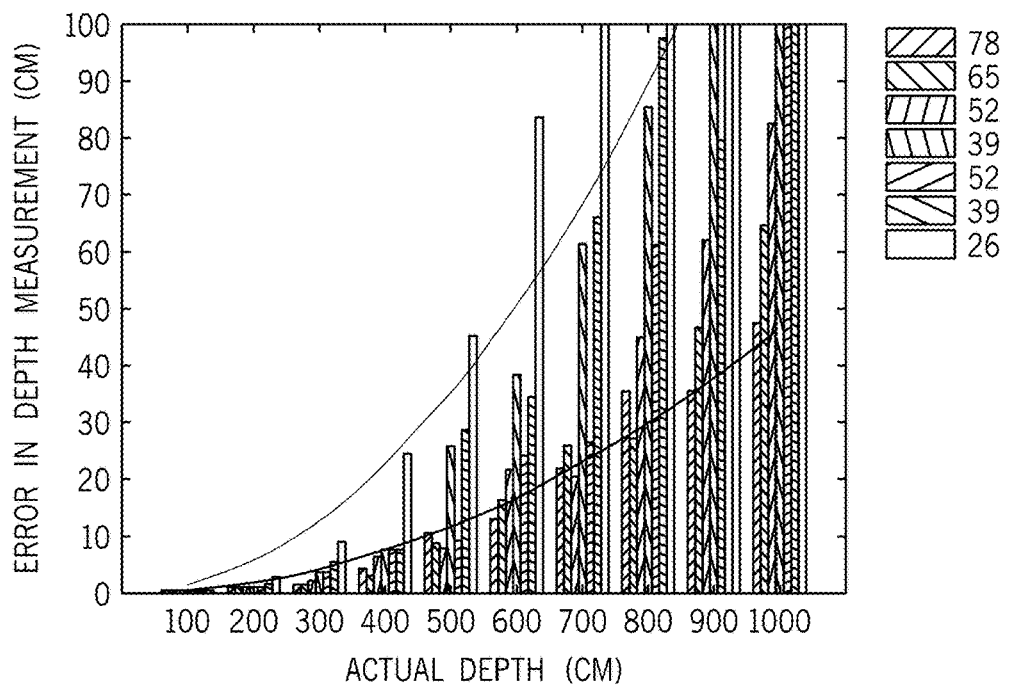
FIG. 8A is a plot of error in measured depth versus depths for different baselines in a three camera array shown in FIG. 8B according to one embodiment.
Figure 8B:
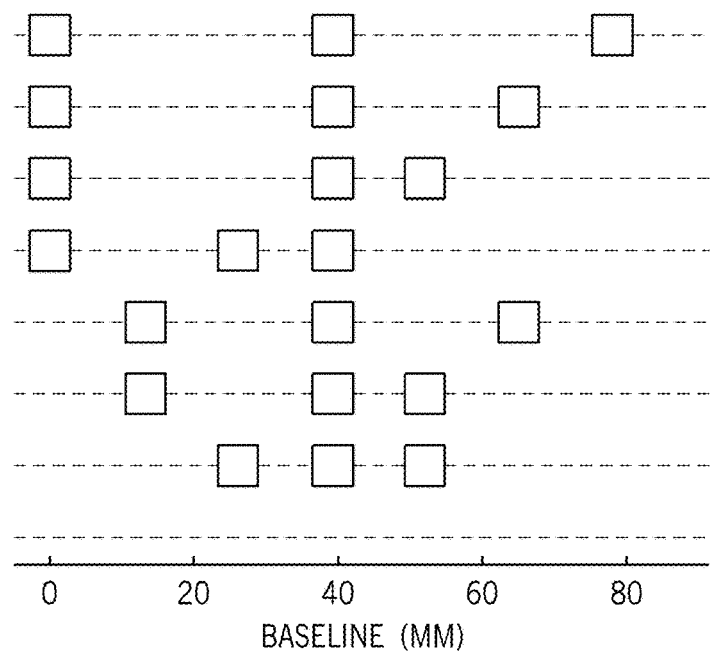
FIG. 8B shows a seven possible camera configurations for a 3 camera system, where the middle camera remains at the same place, while the second and third camera positions are varied and their system performance measured as part of the analysis.

Error in measured depth for a 3-camera system is compared in FIG. 8A with all the cameras aligned on a line as indicated in FIG. 8B. The cameras simulated are generic mobile phone cameras with two megapixel sensor resolution. A special scene with equally spaced boards along the depth dimension (distance from camera) is simulated. Deadleaves' charts are displayed on these boards since they are scale invariant. The boards are spaced a meter apart, starting from depth positions of 1 m to 10 m.

This example (FIG. 8A) is the sort of analysis that can be done with the multi-camera simulation tool. The question that is being asked and answered in this example is "how do the different 3-camera system configurations shown in FIG. 8A compare in their depth estimation performance?" Without a multi-camera simulation tool, such analysis is restricted to being done at a very simplistic level based on first order principles.

FIG. 8A shows the results of depth estimation with the setup shown in FIG. 8B. It can be seen that, as expected from theory, the error increases as the depth of the object increases. Also, the error reduces if the maximum baseline between the cameras increases. The theoretical curves are also shown in the plot and the simulation follows the limits closely. In the case with 52 mm baseline, the placement of the cameras changes the error. This means that with the particular disparity algorithm used here, asymmetric cameras positions wherein two cameras, spaced closer, and third camera is further away are better for depth estimation than three equally spaced cameras.

In the next case, stereo camera pairs are compared with different sensor resolutions while keeping all the other optical and sensor parameters the same. FIG. 9A shows a photorealistic scene simulated for a stereo pair with a baseline of 37.5 mm. FIGS. 9A-E show the simulation results and depth maps of two systems with a 720p (FIG. 9B) and a 1080p (FIG. 9C) mobile phone camera with the optical specifications of a generic 1080p camera and 37.5 mm baseline. The results show that a higher resolution camera not only provides a higher resolution depth map but also provides higher depth resolution and depth range. The measured discrete depth levels in FIGS. 9D and 9E show that the higher resolution 1080p camera (FIG. 9C) has 8 discrete depth levels whereas the 720p camera (FIG. 9B) has 7 depth levels. This consequence of higher resolution in the depth map can improve accuracy in applications such as depth based segmentation.

Figure 10:
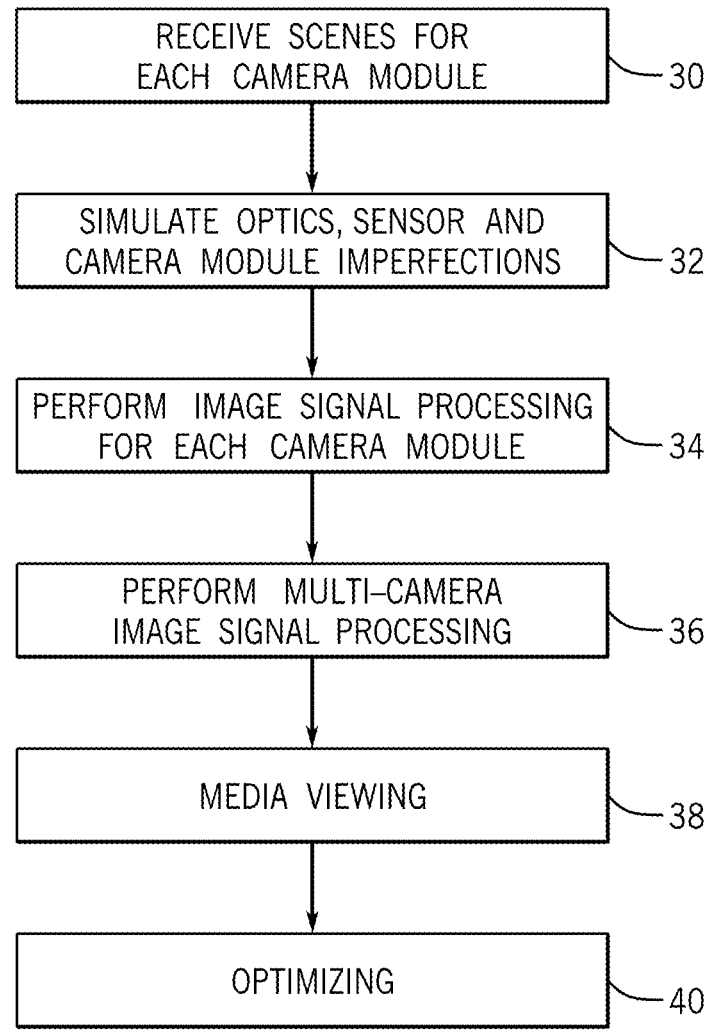
FIG. 10 is a flow chart for one embodiment for the multi-camera simulation and optimization tool for one embodiment.

FIG. 10 shows a sequence that may be implemented in software, firmware and/or hardware. In software and firmware embodiments it may implemented by computer executed instructions stored in one or more non-transitory computer readable media such as magnetic, optical or semiconductor storage.

The sequence begins by receiving scenes for each of the cameras or camera modules of a multi-camera system as indicated in block 30. Then the imperfections in the optics, sensor and camera module may be simulated as indicated in block 32. For example, with respect to the optics module, the lensing effect can be modeled as a blurring operation implemented as a multiplication in the frequency domain and then converted back to the spatial domain as described previously. Other techniques may also be used.

Then as indicated in block 34, image signal processing is performed for each camera or camera module. Finally multi-camera image signal processing is performed at block 36. Intrinsic and extrinsic camera parameters are taken into account as are disparity and depth and other multi-camera parameters.

Then in block 38, media viewing is implemented that helps to visualize special effects. An optimization step 40 can optimize a range of parameters including camera position, camera intrinsic properties, lens properties, sensor properties and camera module tolerances in properties as well as single camera ISP tuning and multi-camera ISP tuning.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 11:
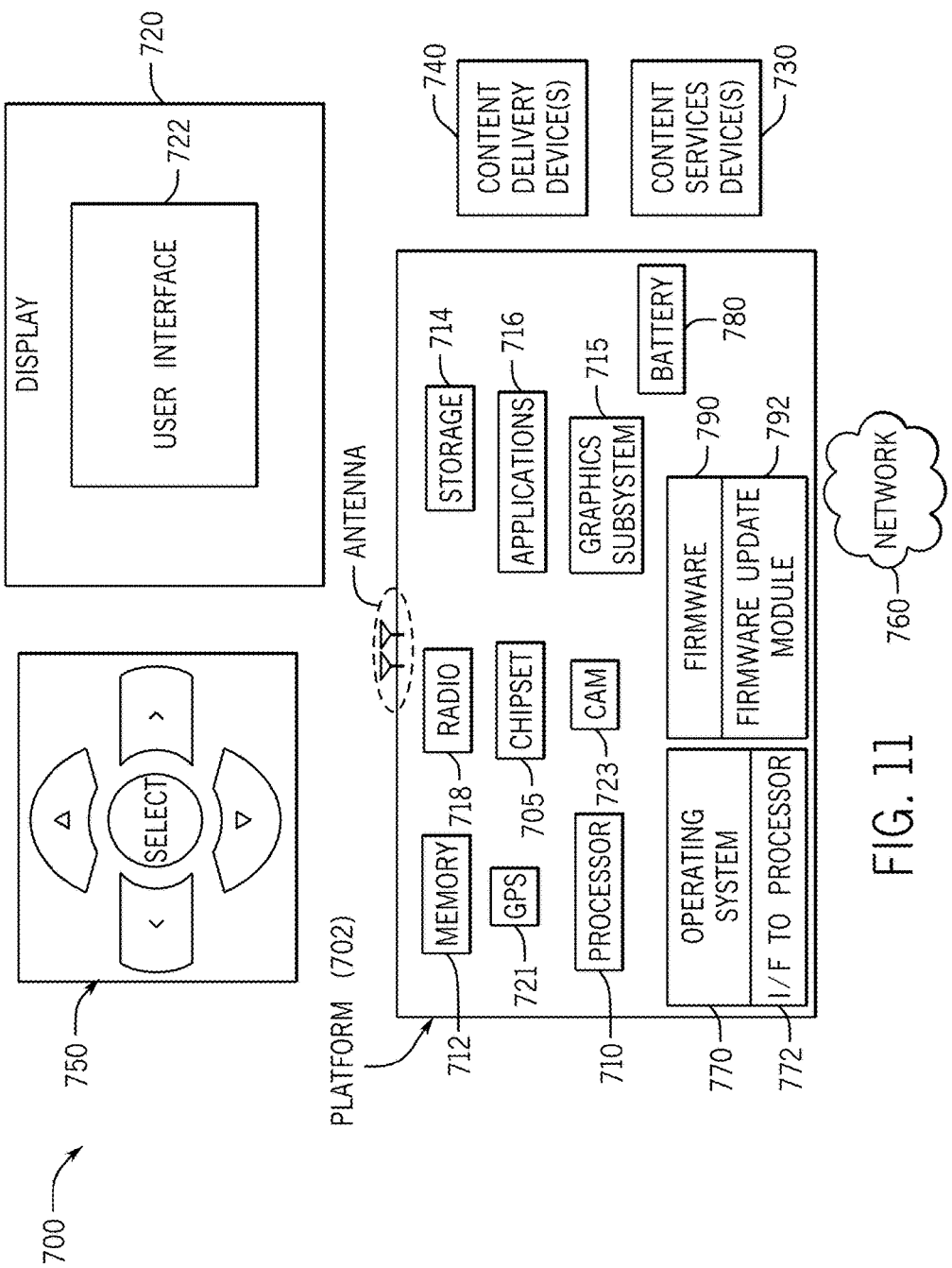
FIG. 11 is a system depiction for one embodiment.

FIG. 11 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 10 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 12:
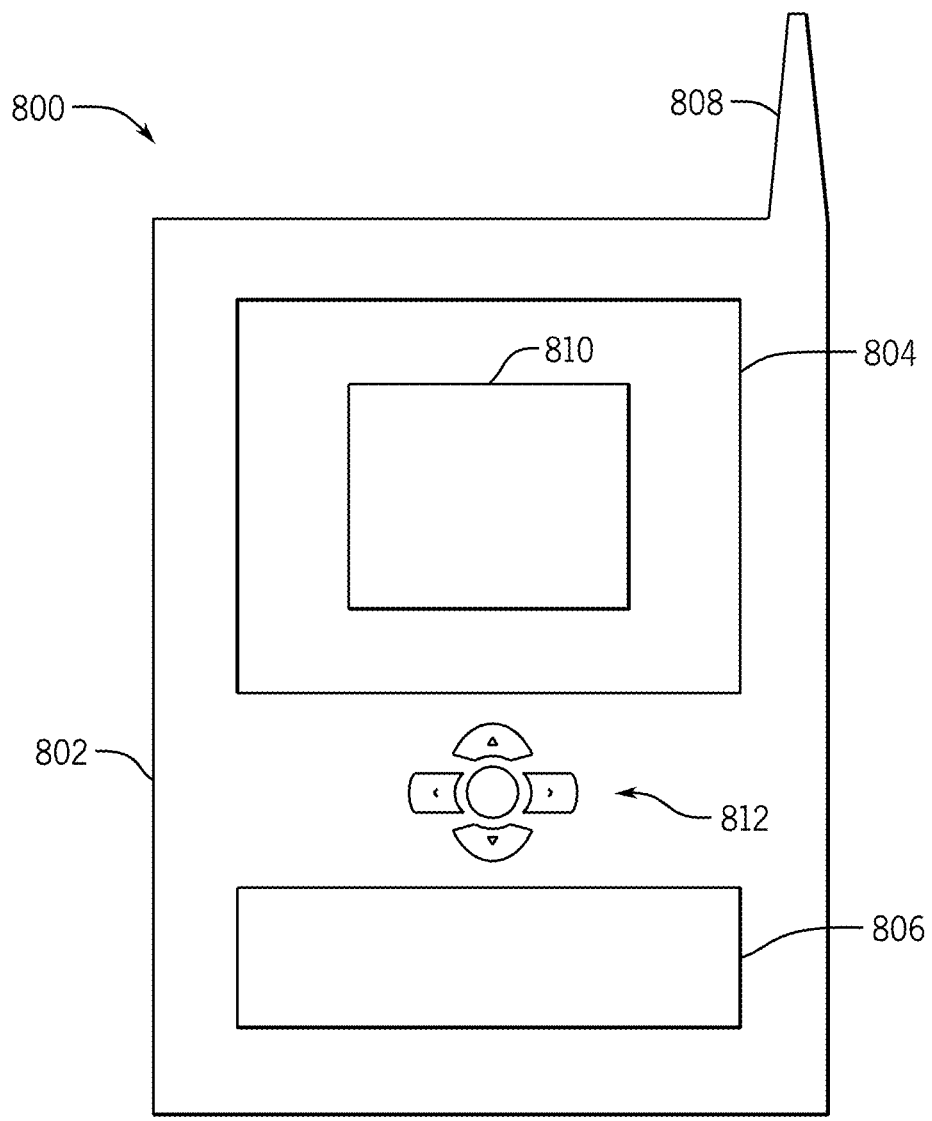
FIG. 12 is front elevation of a system according to one embodiment.

As described above, system 700 may be embodied in varying physical styles or form factors. FIG. 12 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 12, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising pre-computing a scene with an appropriate field of view and parallax using computer graphics, and simulating a multi-camera system using said pre-computed scene. The method may include simulating camera module imperfections for a plurality of camera modules, to produce computer generated images with imperfections for said plurality of camera modules, and using a multi-camera image signal processor to extract depth and disparity for said computer generated images from each camera module. The method may include simulating the effect of optics on a scene in the frequency domain and then converting to the spatial domain. The method may include modeling a lensing effect as a blurring operation using a multiplication in the frequency domain. The method may include computing blur by windowing a small section of a scene. The method may include applying photon capture and electronic effects of a sensor for each camera module. The method may include generating images that account for camera-intrinsic and extrinsic parameters. The method may include simulating a multi-camera system by accounting for the locations of said plurality of camera modules. The method may include modeling lens aberration and diffraction effects. The method may include optimizing for camera positions.

Another example embodiment may be one or more non-transitory computer readable media storing instructions executed by a processor to perform a sequence comprising pre-computing a scene with an appropriate field of view and parallax using computer graphics, and simulating a multi-camera system using said pre-computed scene. The media may further store said sequence including simulating simulating camera module imperfections for a plurality of camera modules, to produce computer generated images with imperfections for said plurality of camera modules, and using a multi-camera image signal processor to extract depth and disparity for said computer generated images from each camera module. The media may further store said sequence including simulating the effect of optics on a scene in the frequency domain and then converting to the spatial domain. The media may further store said sequence including modeling a lensing effect as a blurring operation using a multiplication in the frequency domain. The media may further store said sequence including computing blur by windowing a small section of a scene. The media may further store said sequence including applying photon capture and electronic effects of a sensor for each camera module. The media may further store said sequence including generating images that account for camera-intrinsic and extrinsic parameters. The media may further store said sequence including simulating a multi-camera system by accounting for the locations of said plurality of camera modules. The media may store said sequence including modeling lens aberration and diffraction effects. The media may store said sequence including optimizing for camera positions.

In another example embodiment may be an apparatus comprising a hardware processor to pre-compute a scene with an appropriate field of view and parallax using computer graphics, and simulate a multi-camera system using said pre-computed scene. The apparatus may include said processor to simulate camera module imperfections for a plurality of camera modules, to produce computer generated images with imperfections for said plurality of camera modules, and use a multi-camera image signal processor to extract depth and disparity for said computer generated images from each camera module. The apparatus may include said processor to simulate the effect of optics on a scene in the frequency domain and then converting to the spatial domain. The apparatus may include said processor to model a lensing effect as a blurring operation using a multiplication in the frequency domain. The apparatus may include said processor to compute blur by windowing a small section of a scene. The apparatus may include said processor to apply photon capture and electronic effects of a sensor for each camera module. The apparatus may include said processor to generate images that account for camera-intrinsic and extrinsic parameters. The apparatus may include said processor to simulate a multi-camera system by accounting for the locations of said plurality of camera modules. The apparatus may include said processor to include a inverse fast fourier transform to inverse transform the results of said element by element multiplication. The apparatus may include said processor to include a display communicatively coupled to the circuit. The apparatus may include said processor to include a battery coupled to the circuit.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   generating a 2D projection of a virtual scene using a computer;
   converting the 2D projection into an optical image using an image propagation method via the computer;
   processing the virtual scene to form a de-magnified image of the virtual scene on a sensor plane and imparting lens aberration and diffraction effects to the virtual scene on the sensor plane to produce a raw image via the computer;
   processing the raw image using a camera image signal processing pipe to create virtual images that correspond to images from different real cameras;
   processing the virtual images in a multi-camera image signal processing pipe;
   developing a three-dimensional model of the virtual scene and then to render the virtual scene for each of a plurality of virtual cameras of a virtual multi-camera system using ray tracing; and
   providing field of view and parallax for each of the plurality of virtual cameras of said virtual multi-camera system, according to position of each of said plurality of virtual cameras.

2. The method of claim 1 further including simulating camera module imperfections for a plurality of camera modules, to produce computer generated images with the imperfections for said plurality of camera modules; and
   using a multi-camera image signal processor to extract depth and disparity for said computer generated images from each of said plurality of camera modules.

3. The method of claim 2 including simulating the lens aberration and diffraction effects on the virtual scene in a frequency domain and then converting to a spatial domain.

4. The method of claim 2 including modeling a lensing effect as a blurring operation using a multiplication in a frequency domain.

5. The method of claim 4 including computing blur by windowing a small section of the virtual scene.

6. The method of claim 2 including applying photon capture and electronic effects of a sensor for each of said plurality of camera modules.

7. The method of claim 2 including generating images that account for camera-intrinsic and extrinsic parameters.

8. The method of claim 2 including simulating said virtual multi-camera system by accounting for locations of said plurality of camera modules.

9. The method of claim 2 including modeling the lens aberration and diffraction effects.

10. The method of claim 8 including optimizing for the position of each of said plurality of virtual cameras.

11. One or more non-transitory computer readable media storing instructions executed by a processor to perform a sequence comprising:
    generating a 2D projection of a virtual scene using a computer;
    converting the 2D projection into an optical image using an image propagation method via the computer;
    processing the virtual scene to form a de-magnified image of the virtual scene on a sensor plane and imparting lens aberration and diffraction effects to the virtual scene on the sensor plane to produce a raw image via the computer;
    processing the raw image using a camera image signal processing pipe to create virtual images that correspond to images from different real cameras;
    processing the virtual images in a multi-camera image signal processing pipe;
    developing a three-dimensional model of the virtual scene and then to render the virtual scene for each of a plurality of virtual cameras of a virtual multi-camera system using ray tracing; and
    providing field of view and parallax for each of the plurality of virtual cameras of said virtual multi-camera system, according to position of each of said plurality of virtual cameras.

12. The media of claim 11, said sequence further including:
    simulating camera module imperfections for a plurality of camera modules, to produce computer generated images with the imperfections for said plurality of camera modules; and
    using a multi-camera image signal processor to extract depth and disparity for said computer generated images from each of said plurality of camera modules.

13. The media of claim 12, said sequence including simulating the lens aberration and diffraction effects on the virtual scene in a frequency domain and then converting to a spatial domain.

14. The media of claim 12, said sequence including modeling a lensing effect as a blurring operation using a multiplication in a frequency domain.

15. The media of claim 14, said sequence including computing blur by windowing a small section of the virtual scene.

16. The media of claim 12, said sequence including applying photon capture and electronic effects of a sensor for each of said plurality of camera modules.

17. The media of claim 12, said sequence including generating images that account for camera-intrinsic and extrinsic parameters.

18. The media of claim 12, said sequence including simulating said virtual multi-camera system by accounting for locations of said plurality of camera modules.

19. The media of claim 12, said sequence including modeling the lens aberration and diffraction effects.

20. The media of claim 18, said sequence including optimizing for the position of each of said plurality of virtual cameras.

21. An apparatus comprising:
a hardware processor to generate a 2D projection of a virtual scene using a computer, convert the 2D projection into an optical image using an image propagation method via the computer, process the virtual scene to form a de-magnified image of the virtual scene on a sensor plane and
impart lens aberration and diffraction effects to the virtual scene on the sensor plane to produce a raw image via the computer, process the raw image using a camera image signal processing pipe to create virtual images that correspond to images from different real cameras, develop a three-dimensional model of the virtual scene and then to render the virtual scene for each of a plurality of virtual cameras of a virtual multi-camera system using ray tracing, and provide field of view and parallax for each of the plurality of virtual cameras of said virtual multi-camera system, according to position of each of said plurality of virtual cameras; and
a storage coupled to said processor.

22. The apparatus of claim 21 said processor to simulate camera module imperfections for a plurality of camera modules, to produce computer generated images with the imperfections for said plurality of camera modules, and use a multi-camera image signal processor to extract depth and disparity for said computer generated images from each of said plurality of camera modules.

23. The apparatus of claim 22, said processor to simulate the lens aberration and diffraction effects on the virtual scene in the frequency domain and then converting to the spatial domain.

24. The apparatus of claim 22, said processor to model a lensing effect as a blurring operation using a multiplication in the frequency domain.

25. The apparatus of claim 24, said processor to compute blur by windowing a small section of the virtual scene.

26. The apparatus of claim 22, said processor to apply photon capture and electronic effects of a sensor for each of said plurality of camera modules.

27. The apparatus of claim 22, said processor to generate images that account for camera-intrinsic and extrinsic parameters.

28. The apparatus of claim 22, said processor to simulate said virtual multi-camera system by accounting for the locations of said plurality of camera modules.

29. The apparatus of claim 24, said processor to include an inverse fast fourier transform to inverse transform results of said multiplication.

30. The apparatus of claim 22, said apparatus to include a display communicatively coupled to the processor.

31. The apparatus of claim 22, said apparatus to include a battery coupled to the processor.

* * * * *